United States Patent
Prouzet

(10) Patent No.: US 10,914,381 B2
(45) Date of Patent: Feb. 9, 2021

(54) HYDRAULIC ROTOR BRAKE WITH ADDITIONAL FIRE BARRIER

(71) Applicant: Ratier-Figeac SAS, Figeac (FR)

(72) Inventor: Bertrand Prouzet, Figeac (FR)

(73) Assignee: RATIER-FIGEAC SAS, Figeac (FR)

( * ) Notice: Subject to any disclaimer, the term of this patent is extended or adjusted under 35 U.S.C. 154(b) by 250 days.

(21) Appl. No.: 16/055,524

(22) Filed: Aug. 6, 2018

(65) Prior Publication Data

US 2019/0136977 A1    May 9, 2019

(30) Foreign Application Priority Data

Nov. 6, 2017 (EP) ..................... 17306531

(51) Int. Cl.
| | |
|---|---|
| F16J 15/00 | (2006.01) |
| B64C 27/12 | (2006.01) |
| B60T 1/06 | (2006.01) |
| B60T 11/236 | (2006.01) |
| B64C 27/00 | (2006.01) |
| F16D 65/18 | (2006.01) |
| F16D 65/847 | (2006.01) |
| F16J 15/06 | (2006.01) |
| F16J 15/3268 | (2016.01) |

(Continued)

(52) U.S. Cl.
CPC .............. *F16J 15/004* (2013.01); *B60T 1/062* (2013.01); *B60T 11/236* (2013.01); *B64C 27/006* (2013.01); *B64C 27/12* (2013.01); *F16D 65/18* (2013.01); *F16D 65/847* (2013.01); *F16J 15/062* (2013.01); *F16J 15/3268* (2013.01); *F16J 15/56* (2013.01); *F16D 2055/0016* (2013.01); *F16D 2121/02* (2013.01); *F16D 2121/06* (2013.01); *F16D 2125/08* (2013.01)

(58) Field of Classification Search
CPC ...... F16J 15/004; F16J 15/062; F16J 15/3268; F16J 15/56; B60T 1/062; B60T 11/236; B64C 27/006; B64C 27/12; F16D 65/18; F16D 65/847; F16D 2121/02; F16D 2121/06; F16D 2121/08; F16D 2055/0016
See application file for complete search history.

(56) References Cited

U.S. PATENT DOCUMENTS

| | | |
|---|---|---|
| 3,704,652 A | 12/1972 | Hoenick |
| 3,731,772 A | 5/1973 | Toshida |

(Continued)

FOREIGN PATENT DOCUMENTS

| | | |
|---|---|---|
| EP | 2896850 A1 | 7/2015 |
| GB | 2537062 A | 10/2016 |

OTHER PUBLICATIONS

European Search Report for Application No. 17306531.9-1012, dated May 7, 2018, 9 pages.

*Primary Examiner* — Gilbert Y Lee
(74) *Attorney, Agent, or Firm* — Cantor Colburn LLP

(57) ABSTRACT

New methods and devices are described that are aimed at preventing the outbreak of fire in a hydraulic rotor brake. These methods and devices can be used in the rotor brake of a helicopter and comprise a first and second seal, with a drain groove positioned in between these two seals to drain leaked fluid away from the hot parts of the brake. In the brakes described, the second seal is positioned closer to the heat sink of the brake than the first seal. The drain groove is also connected via a channel or channels to a drain outlet or outlets.

16 Claims, 4 Drawing Sheets

(51) Int. Cl.
  *F16J 15/56* (2006.01)
  *F16D 121/02* (2012.01)
  *F16D 125/08* (2012.01)
  *F16D 121/06* (2012.01)
  *F16D 55/00* (2006.01)

(56) References Cited

U.S. PATENT DOCUMENTS

| | | | | |
|---|---|---|---|---|
| 4,211,151 | A | * | 7/1980 | Wallischeck .............. F16J 7/00 92/146 |
| 5,394,963 | A | * | 3/1995 | Deane ................ B22D 19/0072 188/264 D |
| 5,429,038 | A | | 7/1995 | Black |
| 5,855,471 | A | | 1/1999 | Chory |
| 6,250,437 | B1 | * | 6/2001 | Wang ..................... F16D 65/18 188/72.5 |
| 6,615,705 | B2 | * | 9/2003 | Reinelt .................. E21D 15/15 91/169 |
| 2006/0266600 | A1 | * | 11/2006 | Demers .............. F16D 65/0971 188/264 R |
| 2010/0101899 | A1 | | 4/2010 | Finkel |
| 2012/0091666 | A1 | | 4/2012 | Chelaidite et al. |

* cited by examiner

HYDRAULIC ROTOR BRAKE WITH ADDITIONAL FIRE BARRIER

This application claims priority to European Patent Application No. 17306531.9 filed Nov. 6, 2017, the entire contents of which is incorporated herein by reference.

TECHNICAL FIELD

The examples described herein relate to devices and methods for preventing fire in a hydraulic rotor brake. In particular, these methods and devices can be used in the hydraulic rotor brake of a helicopter.

BACKGROUND

Typical disc brake systems and callipers for use in vehicles (such as cars, trucks, buses, trains, airplanes etc.) are described in US 2012/0091666 A1. In such systems, the brake system comprises a rotor and a calliper body and a piston bore containing a piston. The calliper body also includes at least one inboard brake pad, at least one out board brake pad, an annular seal groove and a seal located in the annual seal groove. The piston may contact the seal and provide interference fit so that fluid does not pass the seal when pressure (caused by the brake) is applied to the piston.

SUMMARY

A hydraulic rotor brake is described herein comprising: a heat sink, a fluid chamber for holding a pressurized hydraulic fluid; a calliper connected to said heat sink, said calliper having a housing with a bore formed therein; a piston positioned within said bore and in contact with said fluid chamber; a first, interference fit seal being provided so as to be in contact with an outer surface of the piston at a first location, and a second, scraper seal being provided in contact with the outer surface of the piston at a second location, wherein said location of said second scraper seal is closer to said heat sink than said first location of said first, interference fit seal; and further comprising: a drain groove positioned between said first and second seals; said drain groove being connected via a channel or channels to a drain outlet.

A drain bottle may be provided that is connected to the outlet. In some examples, the drain bottle may be made from a transparent material with markings provided thereon so that a user can visually determine the amount of fluid drained.

In any of the examples described herein, the bore may comprise a first internal groove and said first seal may be positioned within said first internal groove.

In any of the examples described herein, said bore may comprise a second internal groove and said second seal may be positioned within said second groove.

In any of the examples described herein, said first seal may be configured to prevent leakage of said pressurized fluid in the direction of the second seal.

In any of the examples described herein, said second seal may be configured to prevent dust from reaching the first seal.

In any of the examples described herein, said drain groove may be formed in the inner cylindrical surface of the bore so as to surround at least partway around the outer circumferential surface of the piston.

In any of the examples described herein, said drain groove may extend all the way around the entire outer circumferential surface of the piston.

In any of the examples described herein, the drain groove may comprise a circumferential groove formed in the inner surface of the bore.

In any of the examples described herein, said drain groove may be connected to a channel, or channels.

In any of the examples described herein, said rotor brake may comprise a plurality of pistons and each piston may be in contact with one of said drain grooves. The rotor brake may further comprise at least one channel associated with each drain groove and wherein said channel or channels are connected to a drain outlet. Alternatively, each drain groove may be connected to its own drain outlet.

In any of the examples described herein, said fluid chamber may be formed in said hollow bore of said housing and may comprise an inner diameter D1 at a first section of the bore that is greater than a diameter D2 at a second section of the bore.

In any of the examples described herein, the diameter D2 of the second section of the bore may correspond closely to the outer diameter of said piston so that the outer surface of said piston contacts the inner surface of said bore.

In any of the examples described herein, said bore may comprises a first internal groove and said first seal may be positioned within said first internal groove.

In any of the examples described herein the hydraulic rotor may be for use in a helicopter.

A method for forming a hydraulic rotor brake is also described herein, said method comprising: providing a heat sink; providing a fluid chamber for holding a pressurized hydraulic fluid; providing a calliper that is connected to said heat sink, said calliper having a housing with a bore formed therein; positioning a piston within said bore; a first, interference fit seal being provided so as to be in contact with an outer surface the piston at a first location, and a second, scraper seal being provided in contact with the outer surface of the piston at a second location, wherein said location of said second, scraper seal is closer to said heat sink than said first location of said first, interference fit seal; and further comprising: a drain groove positioned between said first and second seals, said drain groove being connected via a channel or channels to a drain outlet or outlets.

The method may further comprise forming said first seal by forming a first internal groove in said bore and positioning said first seal in said first internal groove.

In any of the examples described herein, the method may further comprise forming said second seal by forming a second internal groove and positioning said second seal within said second groove.

In any of the examples described herein, the first seal may be configured to prevent leakage of said pressurized fluid in the direction of the second seal.

In any of the examples described herein, the second seal may be configured to prevent dust from reaching the first seal.

In any of the examples described herein, the method may further comprise forming said drain groove in the inner cylindrical surface of the bore so that it surrounds at least partway around the outer circumferential surface of the piston.

In any of the examples described herein, the method may further comprise forming said drain groove so that it extends all the way around the entire outer circumferential surface of the piston.

In any of the examples described herein, the method may further comprise forming said drain groove by forming a circumferential groove in the inner surface of the bore.

In any of the examples described herein, the method may further comprise connecting said drain groove to a channel, or channels.

In any of the examples described herein, the method may further comprise providing a plurality of said pistons, each piston being in contact with one of said drain grooves and providing at least one channel associated with each drain groove and connecting said channel or channels to a drain outlet. In some examples, each drain groove may be connected to its own drain outlet via a channel or channels. Some methods may comprise connecting a transparent drain bottle to said drain outlet or outlets and visually checking an amount of drained fluid.

DETAILED DESCRIPTION

As is known in the art, hydraulic brakes use pressurized fluid to push pistons within a brake calliper and generate braking force on a heat sink. As is described in US 2012/0091666 A1, leak-prevention seals have been used to stop fluid from reaching certain parts of the brake.

Figure 1:
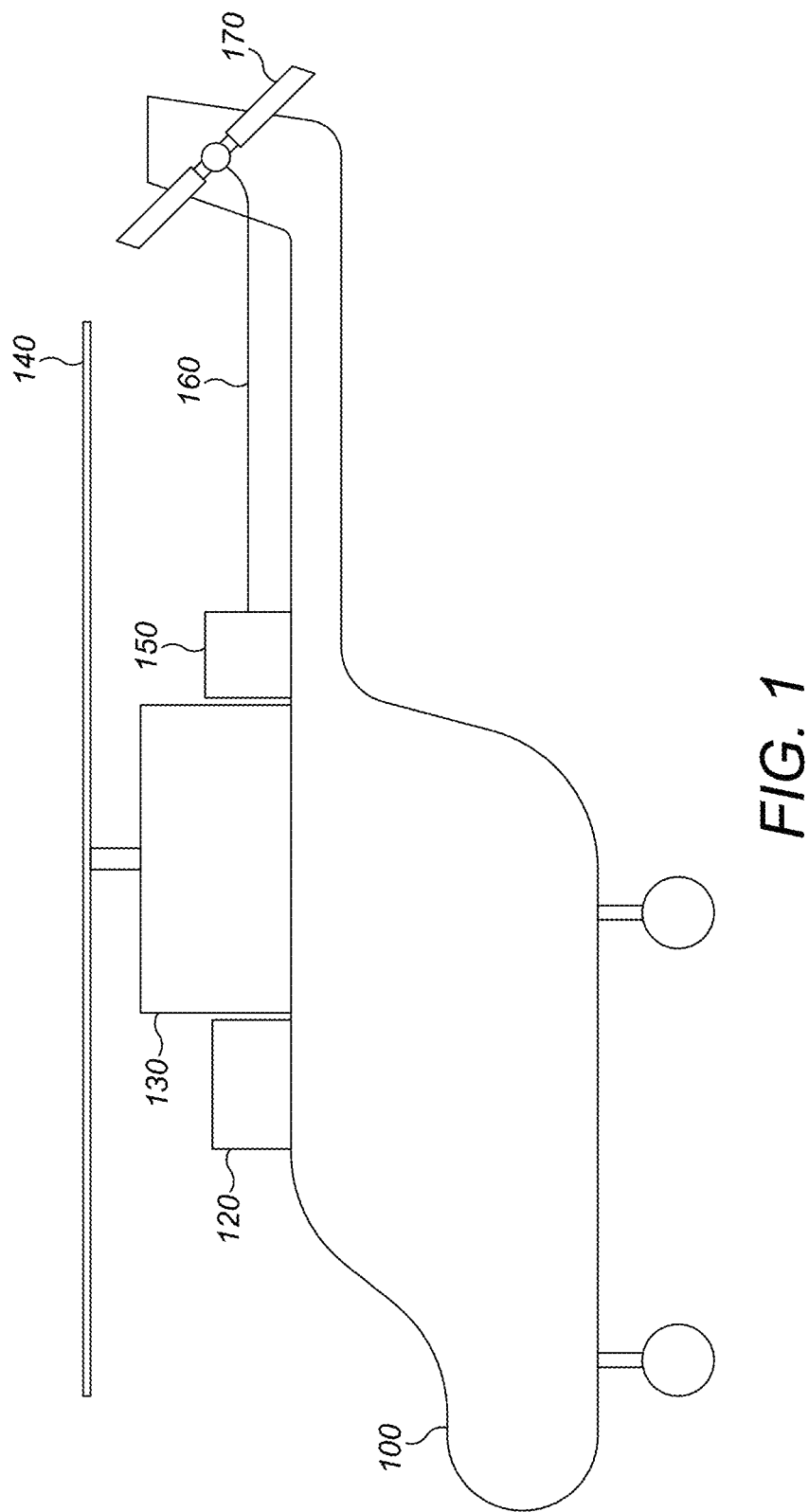
FIG. 1 depicts the basic features of a standard helicopter with a braking system.

Such systems may have drawbacks, however, in that leakage of fluids in certain vehicles can result in a high risk of fire to the vehicle. For example, helicopter rotor brakes are normally located on a helicopter upper deck and positioned close to the engines and other hydraulic circuits. An overview of this is shown in FIG. 1, which depicts the basics of the braking features of a helicopter 100. The helicopter 100 comprises a motor 120, a main gear box 130, a rotor blade 140, a rotor brake 150, a tail rotor shaft 160, and a tail rotor 170.

In use, the pistons (not shown in FIG. 1) of the rotor brake(s) 150 in such systems are pressurized with fluid in order to generate a braking force, and during dynamical braking, the heat sink temperature increases.

Unfortunately, fire hazard is critical in this area and if the piston seal fails during or after a dynamical braking, the pressurized fluid can leak through the seal and come into contact with the hot parts of the brake (e.g. pads, disc) and/or the heat sink. In some situations this can cause the fluid to ignite, thereby even causing a fire to break out on the helicopter.

Although a solution may be to use two dynamic seals, it has been found that this also has drawbacks in that a) the second dynamic seal will have an earlier abnormal wear (because there is no pressurized fluid to insure lubrication), and b) if the first dynamic seal fails, then the failure will be dormant, and c) if a scratch occurs on the piston it is a common failure mode for both of the seals.

Figure 2:
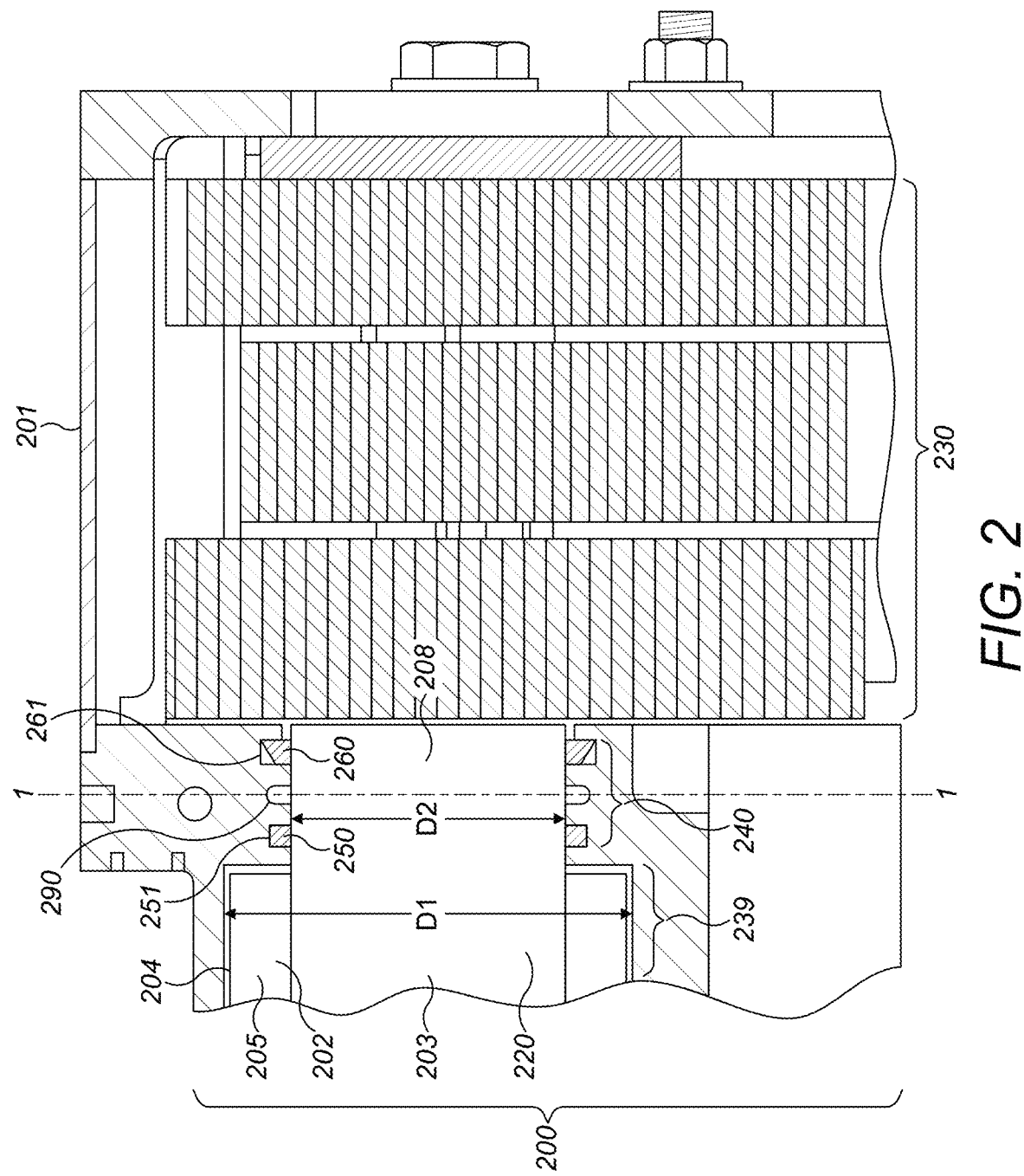
FIG. 2 depicts a side, cut-away view of a calliper housing showing a piston with seals and a drain groove.
Figure 3:
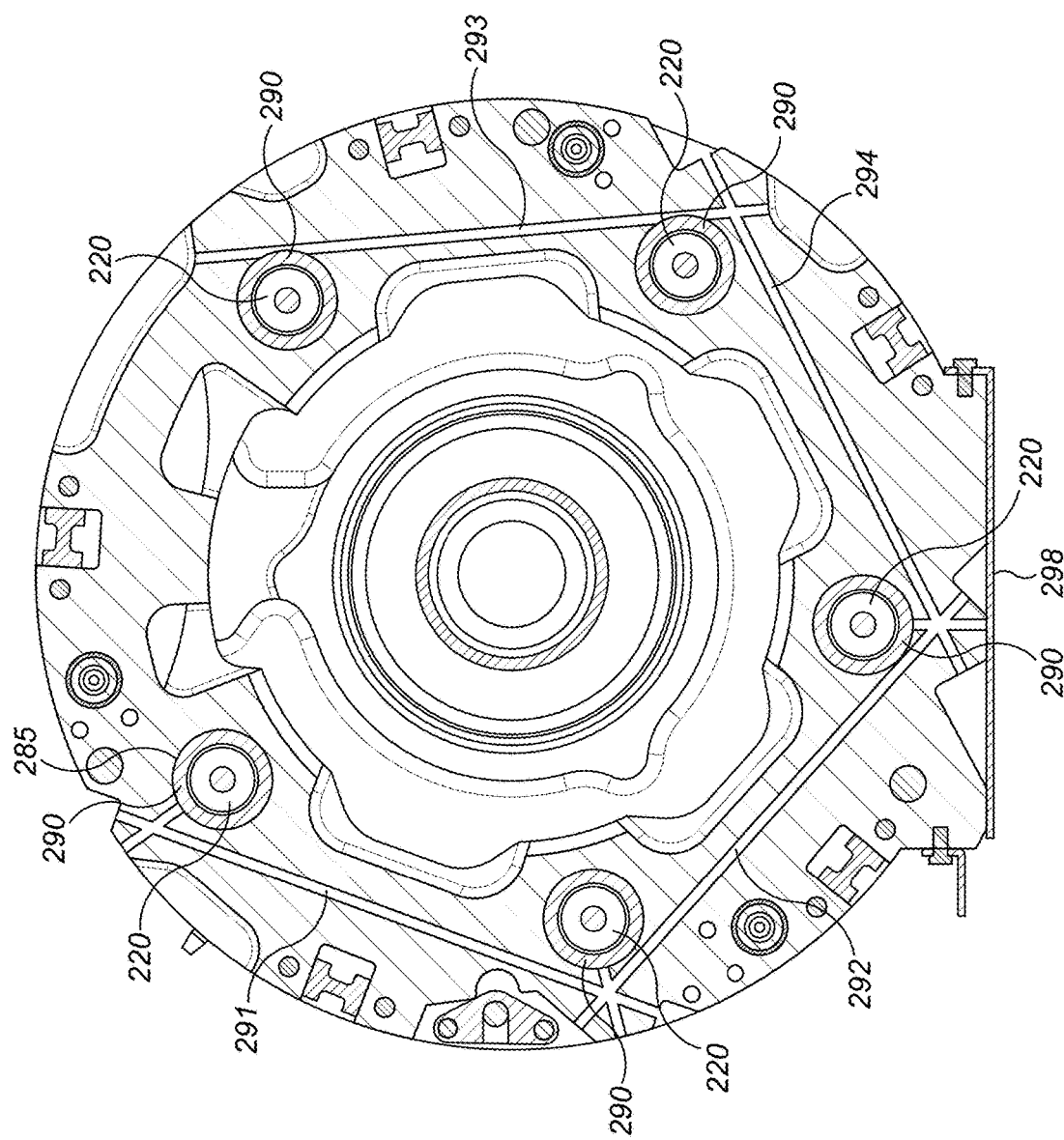
FIG. 3 depicts a cross-sectional view of the calliper housing of FIG. 1, showing five pistons and their interconnecting fluid channels.

Hydraulic rotor brakes 150 described and shown herein with reference to FIGS. 2 and 3 therefore aim to overcome such disadvantages by providing an additional safety barrier to the brake so as to avoid such events. In summary, this is achieved by providing a new way of collecting the fluid between the two seals of differing types, so as to drain any leaked fluid away from the hot parts of the brake and therefore avoid fire ignition. This therefore greatly improves the helicopter safety.

These new methods and devices will now be described in detail, with reference to FIGS. 2 and 3.

Figure 4:
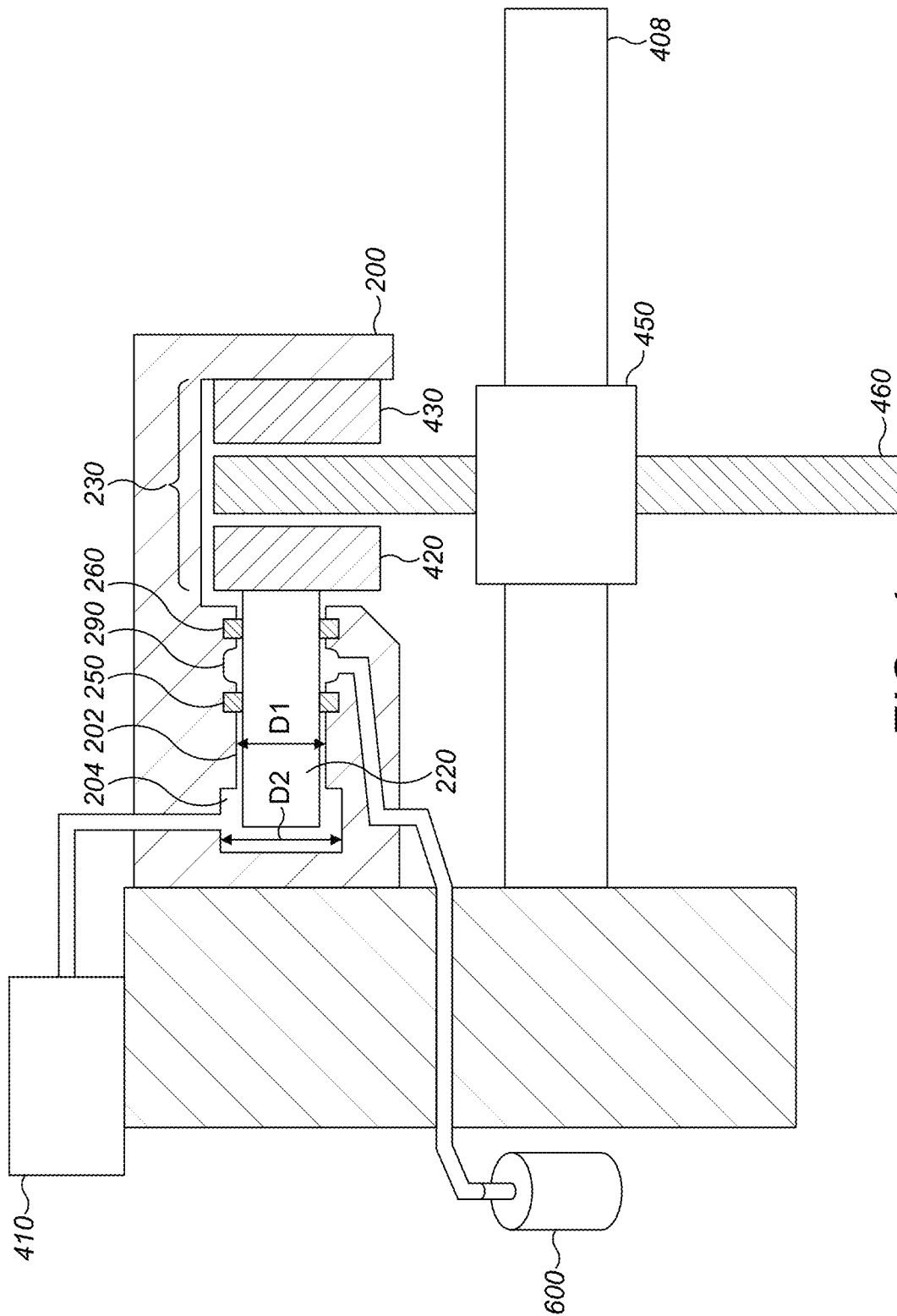
FIG. 4 shows the new drain grooves and seals of FIGS. 2 and 3 within a working hydraulic brake system.

FIG. 4 depicts an overview of the features of the new type of hydraulic rotor brake 150 described herein that may be used in a helicopter 100. Such rotor brakes 150 generally comprise a calliper body 200 that is connected to both a rotor 408 and a hydraulic fluid chamber 204. The rotor calliper body 200 is also connected to a heat sink 230 and the calliper body 200 further comprises an internal bore 202, in which a piston 220 is positioned. In use, the hydraulic brake uses pressurized fluid from the fluid chamber 204 to push the piston 220 or pistons within the brake calliper 200 to generate a braking force on the heat sink 230. FIG. 4 further shows the pressure generator 410 connected to the fluid chamber 204 as well as the moving pad 420 and fixed pad 430 of the heat sink 230. FIG. 4 also depicts the splined shaft 450 that is associated with the tail rotor shaft 408. A floating disk 460 is also associated with the splined shaft. A drain bottle 600 may also be provided to collect the drained fluid. In some examples, this may be a transparent bottle with a level indicator provided thereon so that the level of drained fluid can be assessed visually.

FIG. 2 depicts a side, cut-away view of a calliper 200 of a rotor braking system that has a new type of hydraulic piston sealing arrangement that overcomes the problems with standard systems and that comprises an additional safety feature to those which are provided in known devices. These features are also shown in FIG. 4. In the example shown in FIGS. 2 and 4, the new sealing arrangement is aimed for use in helicopters, to overcome the problems discussed above, however, this arrangement can also be used for any other type of hydraulic device wherein leakage may occur and an extra safety feature is required.

FIG. 2 shows how the calliper 200 comprises a housing 201 that has an internal hollow bore 202, inside which a piston 220 is provided. The inner diameter D1 of the hollow bore 202 is greater at a first section 239 than the diameter D2 at a second section 240 of the hollow bore 202. This section 239 of the bore 202 with a greater diameter therefore provides a fluid chamber 204 having the diameter D1 that surrounds a first portion 203 of the piston 220. The relatively smaller diameter D2 of the second section 240 of the bore is only slightly greater than the diameter of the piston 220 so that the bore contacts the outer surface of the piston 220 at this section.

The fluid chamber 204 contains pressurised hydraulic fluid 205. The fluid chamber 204 is therefore positioned relative to the first portion 203 of the piston so that the fluid contents of the fluid chamber 204 are in contact with the outer surface of this first portion 203 of the piston 220 but not in contact with the second portion 208 of the piston 220.

In this example, the piston 220 comprises a cylindrical shaft, however, any shaped piston may, in theory, be used and the examples should not be limited to this shape. In this example, wherein the hydraulic device is used in a helicopter rotor brake 150, the second portion 208 of the piston 220 may be in contact with a heat sink 230. This arrangement may, however, be used in other situations wherein the prevention of leakage of hydraulic devices may be required.

The example depicted in FIGS. 2 and 3 further comprises a first seal 250 positioned within a first internal groove 251 formed in the bore of the housing 201 and surrounding the outer circumferential surface of the piston 220 at a first location and a second seal 260 positioned within a second groove 261 in the bore 102 of the housing 201 and surrounding the outer circumferential surface of the piston 220 at a second location, which is different to the first location, as can be seen in FIG. 2. The second seal 260 is situated closer to the heat sink 230. In some examples, the first seal 250 may comprise a dynamic seal and/or the second seal 260 may comprise a scraper seal.

The first, dynamic seal 250 may provide an interference fit with the outer surface of the piston 220 to prevent leakage of fluid in the direction of the second seal 260.

When in use as a helicopter rotor brake 150, the scraper seal 260 also contacts the outer surface of the piston 220 and prevents dust from reaching the dynamic seal 250. The scraper seal 260 may be made from a PTFE base ring in contact with the piston rod and an elastomer O-ring used as a spring to maintain contact between PTFE ring & piston. Other materials and means may also be used, however.

As can be seen in FIG. 2, in the improved examples described herein, the bore 202 of the housing 201 further comprises a drain groove 290 that is located within the inner surface of the bore 202 at a third location, the third location being positioned between the first and second seals 250, 260.

The drain groove 290 may further be formed in the inner cylindrical surface of the bore 202 so as to surround at least partway around (and preferably all the way around) the outer circumferential surface of the piston 220. The drain groove 290 may therefore comprise a circumferential groove formed in the inner surface of the housing 201 in which the piston 220 is positioned.

The drain groove 290 may also be further connected to a channel 291, or channels 292, 293, 294 (shown in FIG. 4) for draining any leaked hydraulic fluid away from the drain groove 290 and the piston 220. The drain groove 290 may be connected to these channels 291-294 at the outer circumference 285 of the circular-shaped drain groove 290 (see FIG. 3 which shows a cross-sectional view of FIG. 2 taken along the line 1-1.

As also seen in FIG. 3, the housing 201 may comprise a plurality of pistons 220 (in this example comprising 5 pistons 220). As can be seen in this figure, the drain grooves 290 and channel(s) 291-294 associated with each drain groove 290 may further be connected to the channels associated with the other drain grooves 290, so that the channel(s) 291-294 lead to an outlet 298 in the housing 201, through which the leaked fluid can exit the housing 201.

The drain groove 290 in this example is therefore positioned to be located between the dynamic, leak-preventing seal 250 and the scraper seal 260. Therefore, if a leakage of the dynamic seal 250 occurs, the thin backlash between the piston 220 and the bore 202 within which it is positioned will act as restrictor. Then, when the fluid reaches the drain groove 290, the pressure of the fluid will drop and the fluid will remain trapped in the drain groove 290. In some examples, the channels 291-294 leading from the drain groove(s) 290 may comprise connecting drills. The drills may be connected to the drain hole, or drain outlet 298 and in some examples, the drain outlet 298 may be located at the lowest part of the calliper in use. The user can then use a drain bottle with an oil switch level (or some other means) to check if there is any leakage from the housing 201 based on what is released from the drain outlet 298. For example, the user may perform a visual check of the drain bottle 600 to see if the drain bottle is full. In such examples, the drain bottle can be made from a transparent material such as transparent plastic.

The invention claimed is:

1. A hydraulic rotor brake comprising:
   a heat sink;
   a fluid chamber for holding a pressurized hydraulic fluid;
   a calliper connected to said heat sink, said calliper having a housing with a bore formed therein;
   a piston positioned within said bore and in contact with said fluid chamber;
   a first seal being provided so as to be in contact with an outer surface of the piston at a first location, and
   a second seal being provided in contact with the outer surface of the piston at a second location, wherein said location of said second seal is closer to said heat sink than said first location of said first seal; and further comprising:
   a drain groove positioned at a third location between said first and second seals;
   said drain groove being connected via a channel or channels to a drain outlet;
   wherein the first seal seals the pressurized fluid in the fluid chamber from the drain groove;
   wherein the drain groove drains fluid that leaked through the first seal away from the piston;
   wherein the second seal seals the first seal from the heat sink.

2. The hydraulic rotor brake of claim 1 wherein said bore comprises a first internal groove and said first seal is positioned within said first internal groove.

3. The hydraulic rotor brake of claim 2 wherein said bore comprises a second internal groove and said second seal is positioned within said second groove.

4. The hydraulic rotor brake of claim 1, wherein said first seal is an interference fit seal.

5. The hydraulic rotor brake of claim 1, wherein said second seal is a scraper seal that is configured to prevent dust from reaching the first seal.

6. The hydraulic rotor brake of claim 1, wherein said drain groove is formed in the inner cylindrical surface of the bore so as to surround at least partway around the outer circumferential surface of the piston.

7. The hydraulic rotor brake of claim 6, wherein said drain groove extends all the way around the entire outer circumferential surface of the piston.

8. The hydraulic rotor brake of claim 1, wherein the drain groove comprises a circumferential groove formed in the inner surface of the bore.

9. The hydraulic rotor brake of claim 1, wherein said rotor brake comprises a plurality of said pistons each having said first and second seals and drain grooves and wherein at least one of said channels is associated with each of said drain grooves and wherein said channel or channels are connected to said drain outlet or to a plurality of drain outlets.

10. A method for forming a hydraulic rotor brake said method comprising:
   providing a heat sink;
   providing a fluid chamber for holding a pressurized hydraulic fluid;
   providing a calliper that is connected to said heat sink, said calliper having a housing with a bore formed therein;
   positioning a piston within said bore;
   providing a first, interference seal that seals the fluid chamber from the heat sink and that is in contact with an outer surface the piston at a first location, and providing a second, scraper seal to be in contact with the outer surface of the piston at a second location, wherein said location of said second seal is closer to said heat sink than said location of said first seal and seals the first seal from the heat sink; and further comprising:

wherein the bore includes a drain groove positioned between said first and second seals; said drain groove being connected via a channel or channels to a drain outlet or outlets and drains fluid that leaked through the first seal away from the piston.

11. The method of claim 10 wherein said first seal is an interference fit seal.

12. The method of claim 10, wherein said second seal is a scraper seal that is configured to prevent dust from reaching the first seal.

13. The method of claim 10, further comprising forming said drain groove in the inner cylindrical surface of the bore so that it surrounds at least partway around the outer circumferential surface of the piston.

14. The method of claim 10, further comprising forming said drain groove so that it extends all the way around the entire outer circumferential surface of the piston, and further comprising forming said drain groove by forming a circumferential groove in the inner surface of the bore.

15. The method of claim 10, further comprising connecting a transparent drain bottle to said drain outlet or outlets and visually checking an amount of drained fluid.

16. A hydraulic rotor brake comprising:
a heat sink;
a fluid chamber for holding a pressurized hydraulic fluid;
a calliper connected to said heat sink, said calliper having a housing with a bore formed therein;
a piston positioned within said bore and in contact with said fluid chamber;
a first seal being provided so as to be in contact with an outer surface of the piston at a first location, and
a second seal being provided in contact with the outer surface of the piston at a second location, wherein said location of said second seal is closer to said heat sink than said first location of said first seal; and further comprising:
a drain groove positioned between said first and second seals; said drain groove being connected via a channel or channels to a drain outlet;
wherein said first seal is an interference fit seal that is configured to prevent leakage of said pressurized fluid in the direction of the second seal (260); and the second seal is a scraper seal.

* * * * *